US007330308B2

(12) United States Patent
Kiryu et al.

(10) Patent No.: US 7,330,308 B2
(45) Date of Patent: Feb. 12, 2008

(54) ALIGNMENT METHOD OF MICRO-ALIGNMENT MEMBERS AND DEVICE THEREOF

(75) Inventors: Noriyasu Kiryu, Tokyo (JP); Naoto Miki, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 172 days.

(21) Appl. No.: 11/074,447

(22) Filed: Mar. 8, 2005

(65) Prior Publication Data

US 2005/0200981 A1 Sep. 15, 2005

(30) Foreign Application Priority Data

Mar. 11, 2004 (JP) ............................ 2004-068524

(51) Int. Cl.
*G02B 21/26* (2006.01)

(52) U.S. Cl. ...................... 359/393; 359/822; 359/391

(58) Field of Classification Search ................ 359/822, 359/393

See application file for complete search history.

(56) References Cited

U.S. PATENT DOCUMENTS 5,301,002 A * 4/1994 Nakano ...................... 356/36
5,783,835 A * 7/1998 Hollman et al. ....... 250/559.46
6,621,282 B2 * 9/2003 Hollman .................... 324/758
6,631,302 B1 * 10/2003 Wilson ....................... 700/59

FOREIGN PATENT DOCUMENTS

JP 6-52795 A 2/1994

* cited by examiner

*Primary Examiner*—Jessica T Stultz
(74) *Attorney, Agent, or Firm*—Chapman and Cutler LLP

(57) ABSTRACT

An alignment method of micro-alignment members includes a first step for moving a reticle, which is movably disposed between a first position and a second position, to face a first microscope in the first position, and for aligning a center of the reticle with an optical axis of the first microscope while observing the reticle by the first microscope, a second step for moving the reticle to the second position to face a second microscope in the second position, and for aligning the center of the reticle with an optical axis of the second microscope while observing the reticle by the second microscope, a third step for disposing a first micro-alignment member such that a center of the first micro-alignment member aligns with the optical axis of the second microscope, and a fourth step for disposing a second micro-alignment member instead of the reticle to face the first micro-alignment member.

4 Claims, 13 Drawing Sheets

FIG.9B1 FIG.9B
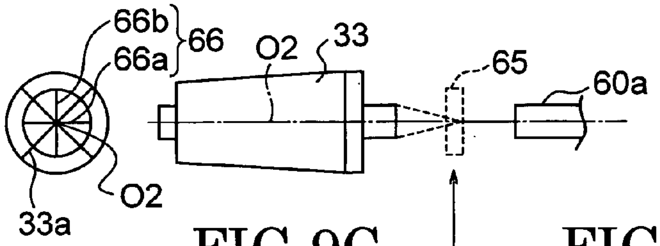
FIG.9C FIG.9A FIG.9A1
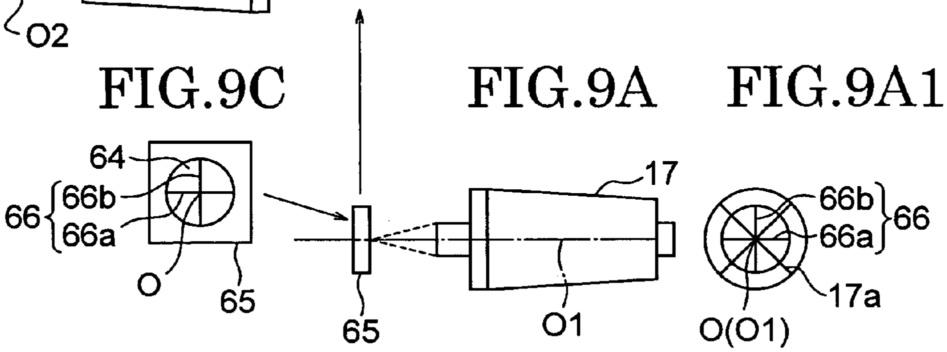
FIG.10A1 FIG.10A
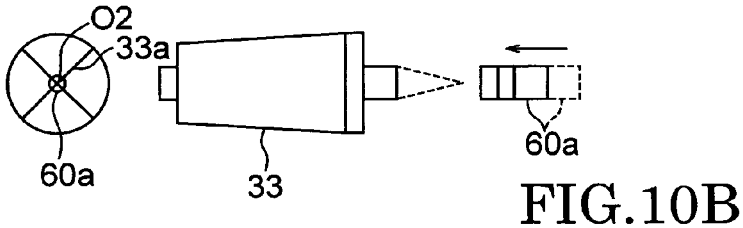
FIG.10B FIG.10B1
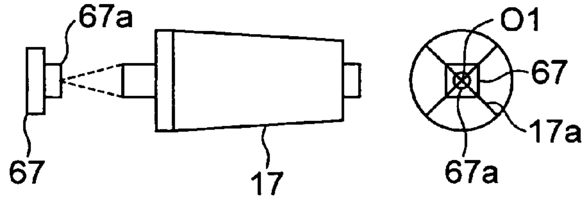
FIG.11
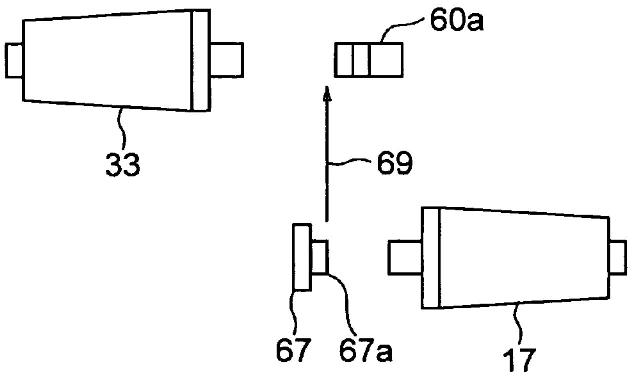

ALIGNMENT METHOD OF MICRO-ALIGNMENT MEMBERS AND DEVICE THEREOF

CROSS-REFERENCE TO THE RELATED APPLICATION

The application claims the priority benefit of Japanese Patent Application No. 2004-68524, field on Mar. 11, 2004, the entire description of which are incorporated herein by reference.

BACKGROUND OF THE INVENTION

1. Field of the Invention

The present invention relates to an alignment method of micro-alignment members and a device thereof for aligning micro-alignment members such as a plurality of micro-optical elements at a short distance with high accuracy.

2. Related Art Statement

Conventionally, there has been a micro-optical element, for example, a waveguide, optical fiver, VCSEL (Vertical Cavity Surface Emitting Laser), etc., as a micro-alignment member.

There is the VCSEL having a laser emitting port of about 15 μm, for example. There is the optical fiber having an outer diameter of 125 μm and a core portion of about 50 μm, for example. When the micro-optical elements such as the foregoing VCSEL and optical fiber are used with facing each other, the micro-optical elements have to be aligned with high accuracy.

As a device for the foregoing alignment, there has been proposed a device for monitoring an alignment state of micro-portions by using microscope TV cameras, for example (reference to JP-A-H06-52795).

However, in the device for observing the alignment state of the micro-portions by using the microscope TV cameras, since the two microscope TV cameras were arranged in the direction orthogonal to each other, it was not suitable when the above described optical fiber and VCSEL aligned by facing each other.

SUMMARY OF THE INVENTION

It is, therefore, an object of the present invention to provide an alignment method of micro-alignment members and a device thereof capable of aligning the micro-alignment members with high accuracy when the micro-alignment members aligns with facing each other.

In order to achieve the above object, the alignment method of micro-alignment members comprise a slide base reciprocatably held to a guide member, a holder mounting member mounted on the slide base, first and second microscopes disposed in sides of the guide member with a space in the longitudinal direction of the guide member, and a first micro-alignment member disposed to face the second microscope across the guide member.

The alignment method of micro-alignment members includes a first step for mounting the reticle on the holder mounting member, for moving the slide base along the guide member such that the reticle faces to the first microscope, and for moving and adjusting the holder mounting member in a direction orthogonal to the optical axis of the first microscope and the moving direction of the slide base such that the center of the reticle aligns with the optical axis of the first microscope.

Moreover, the alignment method of micro-alignment members includes a second step for moving the slide base to face the second microscope, and for moving and adjusting the second microscope in a direction orthogonal to the optical axis of the second microscope and the moving direction of the slide base such that the center of the reticle aligns with the optical axis of the second microscope.

Furthermore, the alignment method of micro-alignment members includes a third step for moving and adjusting the first micro-alignment member in the direction orthogonal to the optical axis of the second microscope and the moving direction of the slide base, such that the center of the first micro-alignment member aligns with the optical axis of the second microscope.

In addition, the alignment method of micro-alignment members includes a fourth step for mounting the second micro-alignment member onto the holder mounting member instead of the reticle 64, such that the second micro-alignment member faces to the first micro-alignment member.

In order to achieve the above object, the alignment device of micro-alignment members comprises a slide base reciprocatably disposed in a guide member, first and second microscopes which are arranged in sides of the guide member with a space in an extending direction of the guide member and have optical axes in the direction orthogonal to the extending direction of the guide member, a first stage for supporting the second microscope, a second stage corresponding to the first stage across the guide member, a mounting portion of a first alignment member provided in the second stage, and a holder mounting member for selectively mounting a holder of a reticle or a holder of a second alignment member, wherein, the holder mounting member is movably and adjustably mounted on the slide base in a direction orthogonal to the optical axis, the first stage is provided with the second microscope to be movable and adjustable in the same directions of the moving direction of the slide base and the moving direction of the holder mounting member, and the second stage is provided with a mounting member of the first micro-alignment member to be movable and adjustable in the same directions of the moving direction of the slide base and the moving direction of the holder mounting member.

BRIEF DESCRIPTION OF DRAWINGS

FIG. 9A is an explanation view showing the relationship between the first microscope and the reticle.

FIG. 9A1 is an explanation view showing the target when the reticle is observed by the first microscope.

FIG. 9B is an explanation view showing the relationship between the second microscope and the reticle.

FIG. 9B1 is an explanation view showing the target when the reticle is observed by the second microscope.

FIG. 9C is a front view showing the reticle.

FIG. 10A is an explanation view illustrating the relationship between the second microscope and the one end portion of the optical fiber.

FIG. 10A1 is an explanation view illustrating the target when the end face of the one end portion of the optical fiber is observed by the second microscope.

FIG. 10B is an explanation view illustrating the relationship between the first microscope and the VCSEL.

FIG. 10B1 is an explanation view showing the target when the VCSEL is observed by the first microscope.

FIG. 11 is an explanation view illustrating the relationships between the first and second microscopes and VCSEL and the one end portion of optical fiber, respectively.

DETAILED DESCRIPTION OF PREFERRED EMBODIMENT

Hereinafter, an embodiment of the present invention will be described with reference to the accompanying drawings.

Figure 1A:
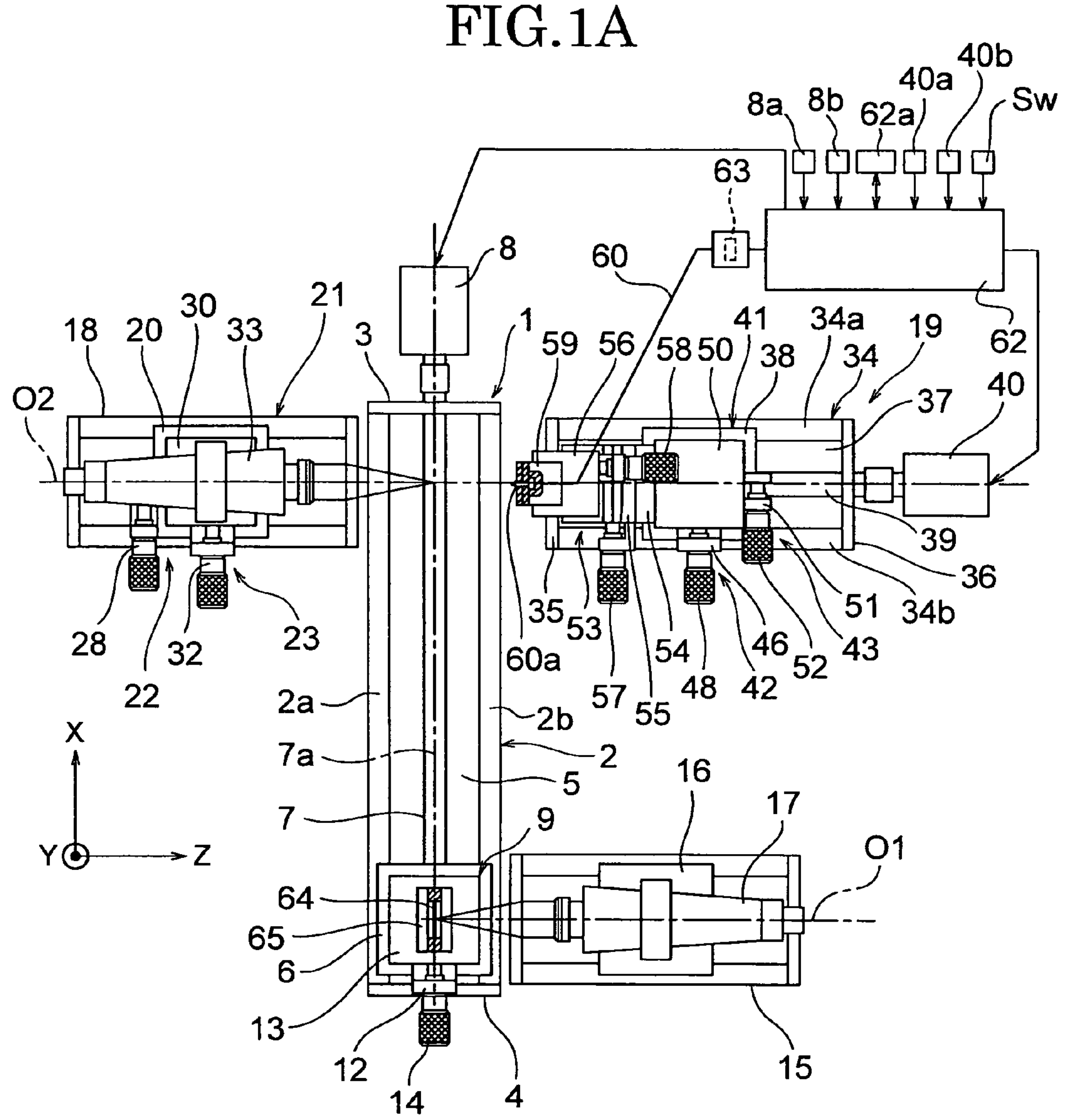
FIG. 1A is a plan view illustrating an alignment device of micro-alignment members with a state that a reticle according to the present invention faces to a first microscope.
Figure 2A:
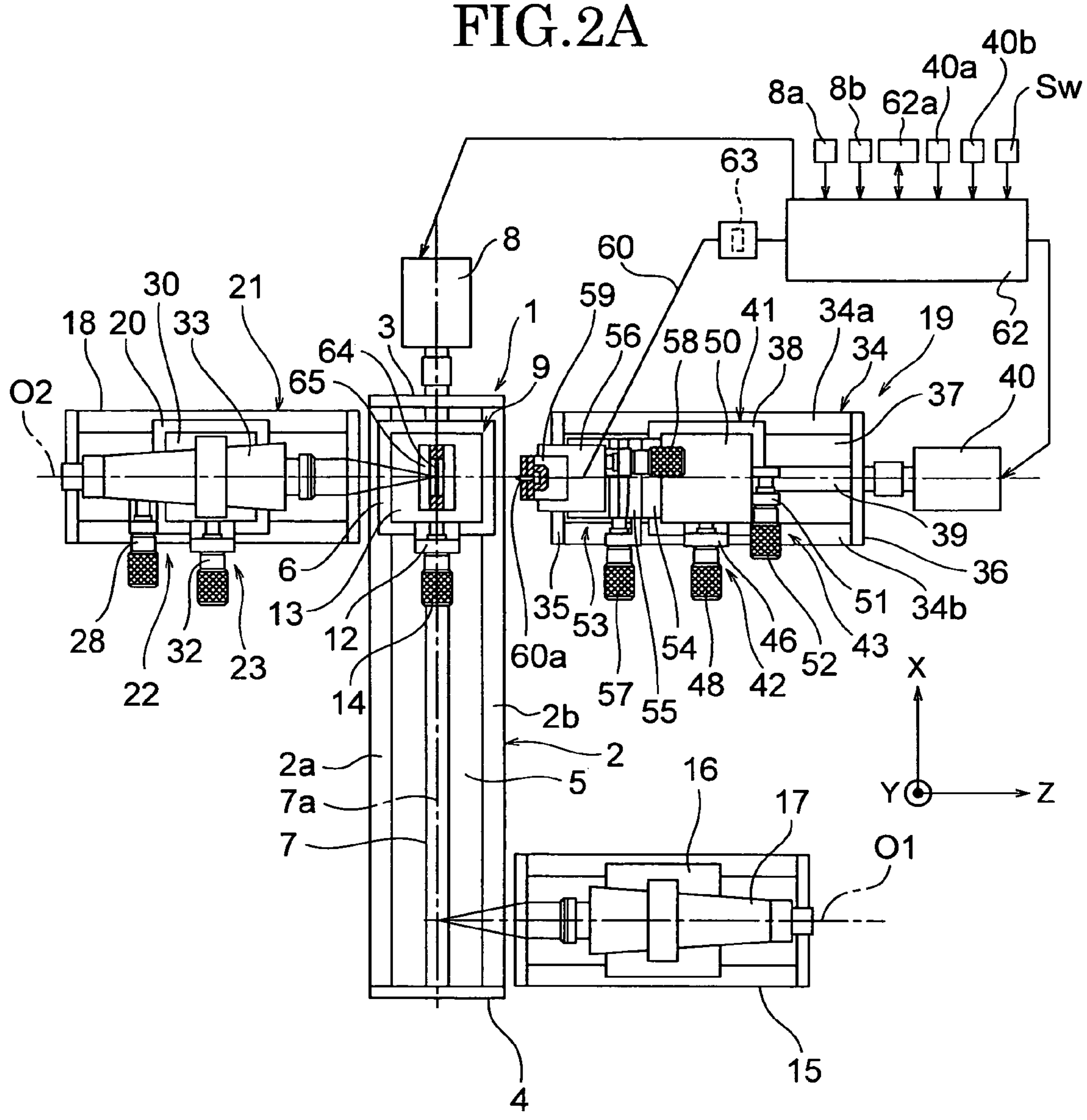
FIG. 2A is a plan view illustrating an alignment device of micro-alignment members with a state that the reticle shown in FIG. 1 faces to a second microscope.
Figure 2B:
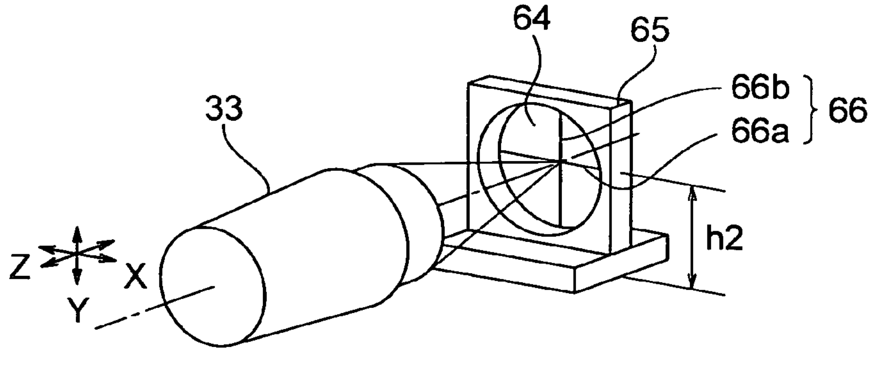
FIG. 2B is a perspective view showing a relationship between the reticle and the second microscope shown in FIG. 2A.

In FIGS. 1A, 2A, a reference numeral 1 denotes a first guide frame (guide member) extending linearly and horizontally. The first guide frame 1 comprises a channel like frame body 2 including side walls 2*a*, 2*b* and end plates (end walls) 3, 4 respectively secured to the both end portions of the longitudinal direction of the frame body 2. A guide groove 5 is formed between the side walls 2*a*, 2*b* of the first guide frame 1. Here, the direction in which the first guide frame 1 extends is adopted as an X-direction; the up-and-down direction orthogonal to the X-direction is adopted as a Y-direction; and the direction orthogonal to the X-direction and the Y-direction is adopted as a Z-direction.

Figure 3:
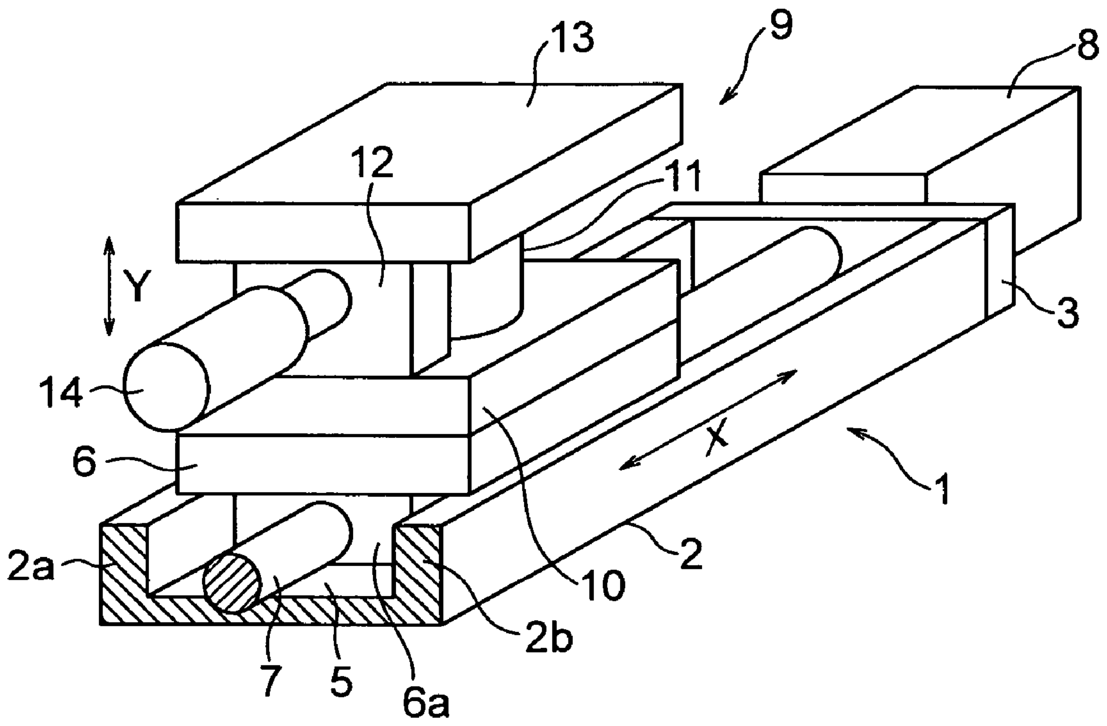
FIG. 3 is a partial perspective view including the first guide frame, elevation base, and the like shown in FIG. 1A.

A slide base 6 shown in FIG. 3 is disposed on the guide frame 1. The slide base 6 integrally has at the lower portion a guide projection 6*a* movably disposed in the longitudinal direction in the guide groove 5. Accordingly, the slide base 6 is held to the guide frame 1 to be reciprocatable in the longitudinal direction.

A ball screw (feeding screw) 7 is arranged in the guide groove 5 parallel to the side walls 2*a*, 2*b*. As shown in FIG. 3, the ball screw 7 passes through the guide projection 6*a*, and the both end portions of the ball screw 7 are rotatably held to the end plates 3, 4 as shown in FIG. 1A, 2A. A plurality of balls (not shown) is kept in the guide projection 6*a* to engage with threads (not shown) of the ball screw 7.

Therefore, the slide base 6 reciprocates in the longitudinal direction of the guide frame 1 by normally rotating or reversely rotating the ball screw 7. The ball screw 7 can be normally and reversely rotated by a driving motor 8 such as a pulse motor. In addition, the driving motor 8 is secured to the end plate 3.

An up-and-down direction (Y-direction) adjusting device (elevation adjusting device) 9 is disposed on the slide base 6 as shown in FIG. 3.

Figure 4:
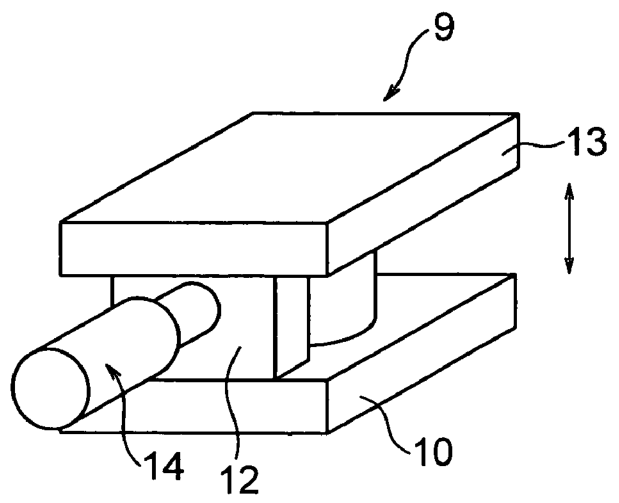
FIG. 4 is a perspective view showing the elevation base illustrated in FIG. 3.

As shown in FIG. 3, the up-and-down direction adjusting device 9 comprises a fixed base 10 placed on the slide base 6, a guide tube 11 which is disposed in the center of the fixed base 10, and extends in the up-and-down direction (Y-direction), a bracket 12 secured to the fixed base 10, an elevatable elevation base (holder mounting member, holder mounting base) 13 attached to the guide tube member 11, and a micrometer 14 installed in the bracket 12 to elevate the elevation base 13 upwardly and downwardly (reference to FIG. 4).

A second guide frame 15 is disposed in the right side of the one end of the guide frame 1. The second guide frame 15 extends in the direction orthogonal to the guide frame 1 (Z-direction).

A slide base 16 is mounted on the second guide frame 15 as shown in FIGS. 1A, 2A. The slide base 16 is movable and adjustable in the longitudinal direction (Z-direction) of the second guide frame 15. A first microscope 17 in which the optical axis is directed to the Z-direction is placed on the slide base 16.

Moreover, the both sides of the other end of the guide frame 1 are provided with third and fourth guide frames 18, 19 extending in the direction (Z-direction) orthogonal to the guide frame 1.

A slide base 20 is mounted on the third guide frame 18, which is movable and adjustable in the direction along the longitudinal direction (Z direction) of the third guide frame 18. An X-Y adjusting device 21 as X-Y adjusting means (X-Y adjusting mechanism) is placed on the slide base 20.

Figure 5:
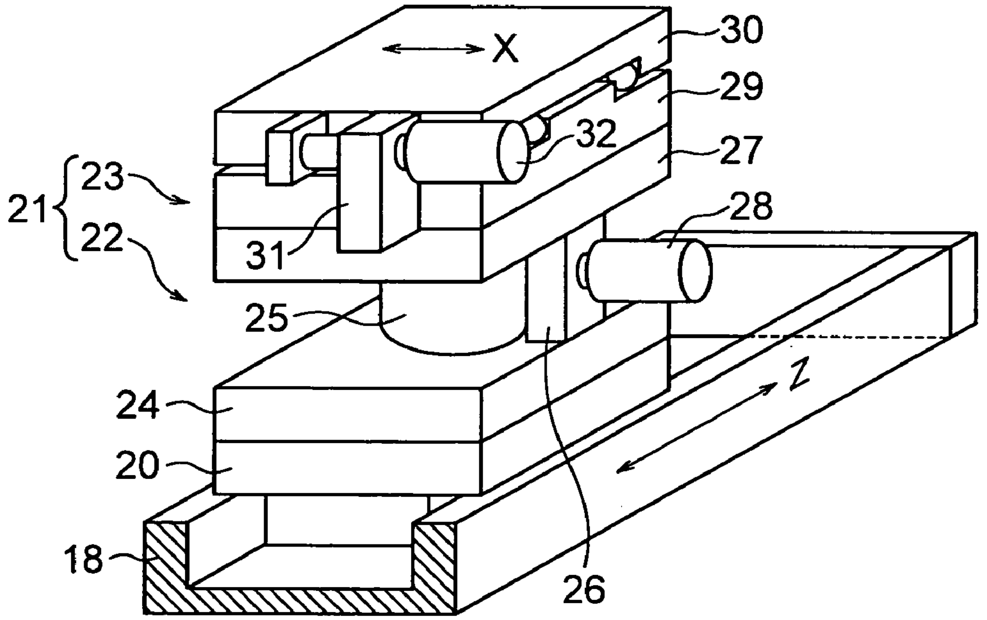
FIG. 5 is a partial perspective view including an X-table for supporting the second microscope shown in FIG. 1A.

The X-Y adjusting device 21 comprises a Y-direction moving device 22 of Y-direction moving mechanism (Y-direction moving means) and an X-direction moving device 23 of X-direction moving mechanism (X-direction moving means) placed on the Y-direction moving device 22 as shown in FIG. 5.

As shown in FIG. 5, the Y-direction moving device 22 comprises a fixed base 24 secured on the slide base 20, a guide tube portion 25 which is provided in the center of the fixed base 24 and extends in the up-and-down direction (Y-direction), a bracket 26 secured to the fixed base 24, an elevatable elevation base 27 (holder mounting member, holder mounting base) which is disposed to the guide tube portion 25 and extends in the up-and-down direction (Y-direction), and a micrometer 28 installed in the bracket 26 to elevate the elevation base 27 upwardly and downwardly.

As shown in FIG. 5, the X-direction moving device 23 comprises an X-base 29 fixed onto the elevation base 27, an X-table 30 placed onto the X-base 29 to be movable in the longitudinal direction (X-direction) of the guide flame 1, a bracket 31 attached to the X-base 29, and a micrometer 32 secured to the bracket 31 to reciprocate the X-table 30 in the X-direction. The X-table 30 is provided with a second microscope 33 in which the optical axis is directed to the Z direction.

A slide base 38 is placed onto the fourth guide flame 19. The slide base 38 is movable and adjustable in the direction along the longitudinal direction (Z direction) of the fourth guide frame 19. The fourth guide frame 19 comprises a channel like frame body 34 including side walls 34*a*, 34*b*, end plates 35, 36 respectively secured to the both end portions of the longitudinal direction of the frame body 34. A guide groove 37 is formed between the side walls 34*a*, 34*b* of the guide frame 19.

Figure 6:
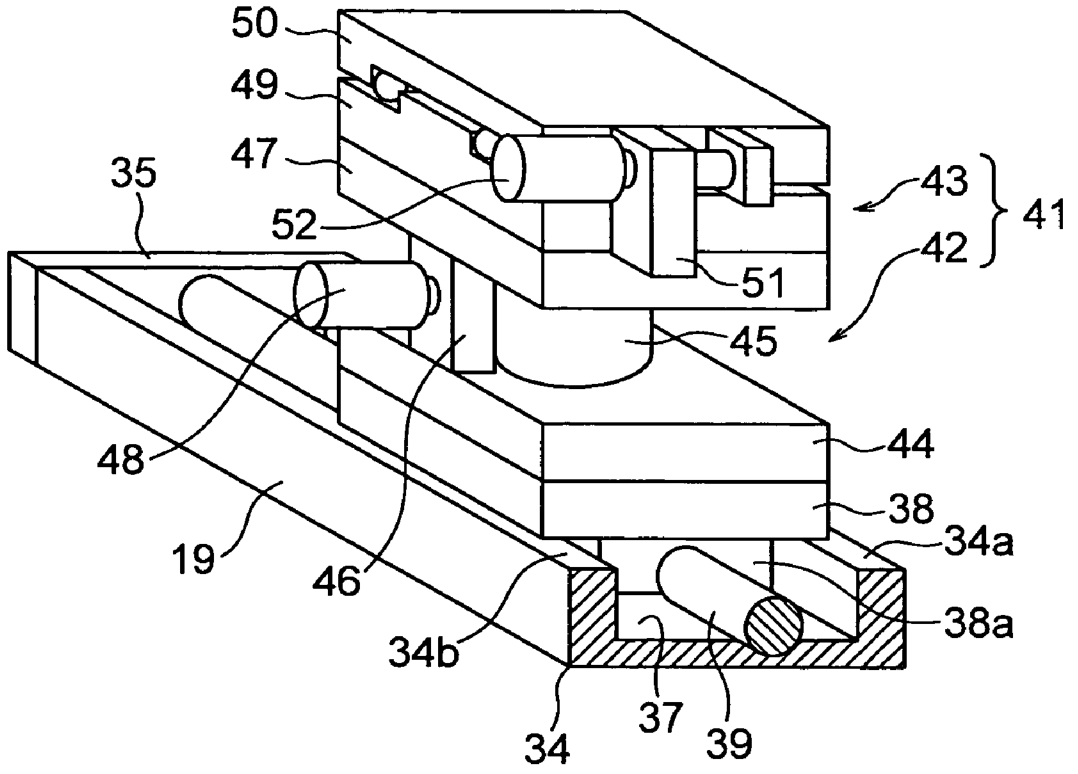
FIG. 6 is a partial perspective view including the table, etc., for supporting the tilting equipment for holding the end portion of the optical fiber shown in FIG. 1A.

A slide base 38 is disposed onto the guide frame 19 as shown in FIGS. 1A, 2A, 6. The slide base 38 integrally has at the lower portion a guide projection 38*a* disposed in the guide groove 37 to be movable in the longitudinal direction. Accordingly, the slide base 38 is held to the guide frame 1 to be reciprocatable in the longitudinal direction.

In addition, the guide groove 37 is provided with a ball screw (feeding screw) 39 parallel to the side walls 34*a*, 34*b*. As shown in FIG. 6, the ball screw 39 passes through the guide projection 38*a* and the both end portions of the ball screw 39 are rotatably held to the end plates 35, 36. A plurality of balls (not shown) is kept in the guide projection 38*a* to engage with screw threads (not shown) of the ball screw 39.

The slide base 38, thus, reciprocates in the longitudinal direction (Z direction) of the guide frame 19 by normally rotating or reversely rotating the ball screw 39. The ball screw 39 is adopted to be normally rotatable and reversely rotatable by a driving motor 40 such as a pulse motor shown in FIGS. 1A, 2A. Moreover, the driving motor 40 is secured to the end plate 36.

An X-Y adjusting device 41 as X-Y adjusting means (X-Y adjusting mechanism) is placed onto the slide base 38 as shown in FIG. 6.

The X-Y adjusting device 41 comprises a Y-direction moving device 42 of a Y-direction moving mechanism (Y-direction moving means) and an X-direction moving device 43 of a X-direction moving mechanism (X-direction moving means) placed onto the Y-direction moving device 42 as shown in FIG. 6.

The Y-direction moving device 42 comprises a fixed base 44 fixed onto the slide base 38, a guide tube portion 45 disposed in the center of the fixed base 44, extending in the up-and-down direction (Y-direction), a bracket 46 secured to the fixed base 44, an elevatable elevation base (holder mounting member, holder mounting base) 47 mounted onto the guide tube portion 45, extending in the up-and-down direction (Y-direction), and a micrometer 48 attached to the bracket 46 to elevate the elevation base 47 upwardly and downwardly.

As shown in FIG. 6, the X-direction moving device 43 comprises an X-base 49 secured onto the elevation base 47, an X-table 50 mounted onto the X-base 49 to be movable in the longitudinal direction (X-direction) of the guide frame 1, a bracket 51 attached to the X-base 49, and a micrometer 52 attached to the bracket 51 to reciprocate the X-table 50 in the X-direction.

Tilting equipment 53 is placed onto the X-table 50 as shown in FIGS. 1A, 2A.

The tilting equipment 53 comprises a fixed table 54 fixed onto the X-table 50, a horizontal rotating table 55 mounted onto the fixed table 54 in horizontally rotatable manner, and a up-and-down rotating table (second stage) 56 mounted on the horizontal rotating table 55 in upwardly and downwardly rotatable manner. The horizontal rotating table 55 can rotate in the horizontal direction by a micrometer 57, and the up-and-down rotating table 56 can rotate in the up-and-down direction by a micrometer 58.

A holder 59 is mounted onto the up-and-down rotating table 56, and one end portion 60*a* of an optical fiber 60 is held to the holder 59.

Figure 15:
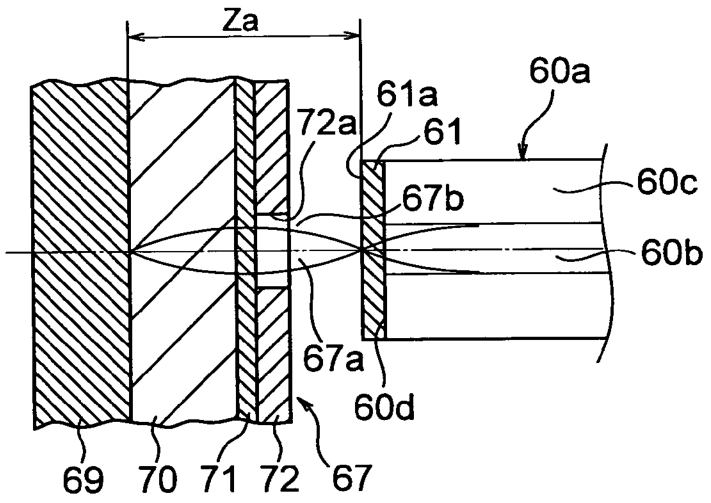
FIG. 15 is a cross-section view showing the relationship between the VCSEL and the one end portion of the optical fiber.
Figure 16:
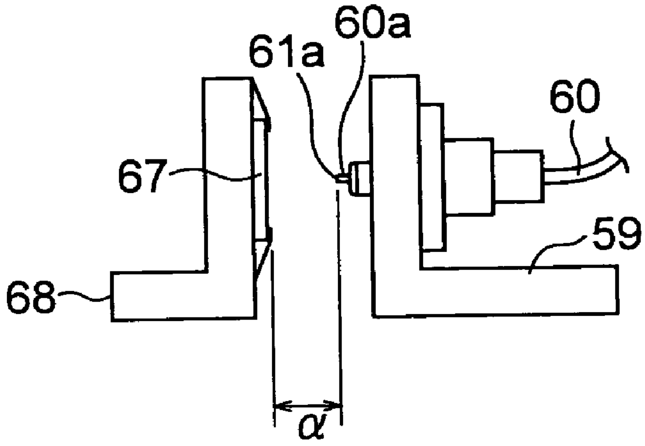
FIG. 16 is a side view illustrating the relationship between the VCSEL and the one end portion of optical fiber.

The optical axis of the one end portion 60*a* of the optical fiber 60 is directed toward the Z-direction. The optical fiber 60 comprises a core 60*b* and a clad 60*c* neighboring thereof. An end face 60*d* of the core 60*b* of the optical fiber 60 is formed with a mirror surface layer 61 as illustrated in FIG. 15. A reference numeral 61*a* is an end face of the mirror surface layer 61.

In addition, the horizontal rotating table 55 and the up-and-down rotating table 56 can rotate around the center of the leading end of the optical fiber 60. Furthermore, by constructing the above, the holder 59 for the optical fiber 60 has flexibility of five-axis such as the movement in the X, Y, and Z direction, horizontal rotation, and up-and-down rotation.

The aforementioned driving motors 8, 40 are activated and controlled by an arithmetic and control circuit (arithmetic and control device) 62 illustrated in FIGS. 1A, 2A. An output signal is input to the arithmetic and control circuit 62 from a light-receiving sensor (light-receiving device) 63, and light enters to the light-receiving sensor 63 from the other end of the optical fiber 60.

Moreover, the arithmetic and control circuit 62 is connected with a switch 8*a* for normally rotating the driving motor 8, a switch 8*b* for reversely rotating the driving motor 8, a switch 40*a* for normally rotating the driving motor 40, and a switch 40*b* for reversely rotating the driving motor 40. Furthermore, the arithmetic and control circuit 62 is connected with a memory 62*a* and a start switch SW.

Hereinafter, an alignment method of the above structure will be described.

(1) Adjustment by a Reticle (Alignment by the First Microscope 17)

Figure 1B:
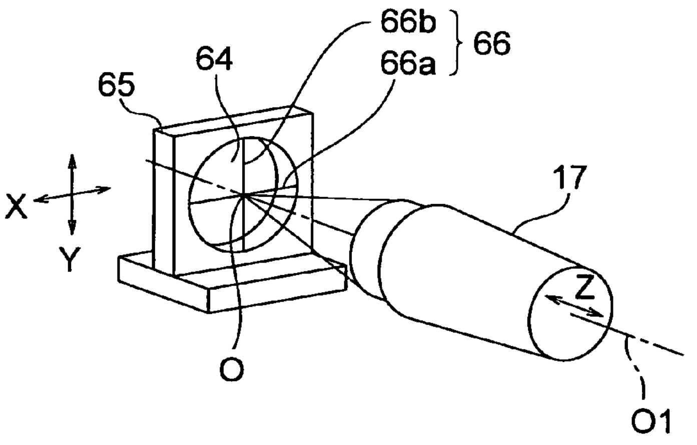
FIG. 1B is a perspective view showing a relationship between the reticle and the first microscope illustrated in FIG. 1A.

A reticle holder 65 to which a reticle 64 shown in FIGS. 1A, 1B is attached is prepared, and then the reticle holder 65 is mounted on the elevation base 13 of the holder mounting member as shown in FIG. 1A.

In addition, the reticle 64 is provided with a cross line (target) 66 formed in the cross line shape by an X-direction line 66*a* and a Y-direction line 66*b*. O represents the center which is the point at the intersection of the X-line 66*a* with the Y-line 66*b*. The center O of the reticle 64 is positioned in the X-Y plane (vertical plane) including an axis line 7*a* of the ball screw 7.

With this state, if a worker presses the switch 8*a*, the arithmetic and control circuit 62 normally rotates the driving motor 8, the ball screw 7 normally rotates by the rotation of the driving motor 8, and then the slide base 6 shifts to the end plate 4 side along the guide frame (guide member) 1.

On the contrary, if the worker presses the switch 8*b*, the arithmetic and control circuit 62 reversely rotates the driving motor 8, the ball screw 7 reversely rotates by the rotation of the diving motor 8, and then the slide base 6 shifts to the end plate 3 side along the first guide frame (guide member) 1. The foregoing shift is carried out while the switches 8*a*, 8*b* are being pressed.

The reticle 64 faces to the first microscope 17 by the operation of the switches 8*a*, 8*b*. The first microscope 17 is provided with a cross line (target line) 17*a* inclined at 45° as illustrated in FIG. 9A1, and the center of the cross line 17*a* is the optical axis O1 of the first microscope 17.

After the reticle 64 has faced to the first microscope 17 as illustrated in FIG. 9A, while observing the reticle 64 by the first microscope 17 for the focus adjustment, the slide base 6 reciprocates in the X-direction by operating the switches 8*a*, 8*b*, and the optical axis O1 of the first microscope 17 aligns with the Y-line 66*b* of the reticle 64 by reciprocating the slide base 16 in the optical axis O1 direction.

Next, while observing the reticle 64 by the first microscope 17, the elevation base (holder mounting member) 13 is adjusted (micromotion operation) in the direction (Y-direction) orthogonal to the optical axis O1 of the first microscope 17 and the moving direction of the slide base 6 by operating the micrometer 14, such that the center O of the reticle 64 aligns with the optical axis O1 of the first microscope 17.

(Alignment by the Second Microscope 33)

After the center O of the reticle 64 has aligned with the optical axis O1 of the first microscope 17, the driving pulse is supplied to the driving motor 8 from the arithmetic and control circuit 62 by pressing the switch 8*b*, the driving motor 8 reversely rotates by the driving pulse, the ball screw 7 reversely rotates by the reverse rotation of the driving motor 8, and then the slide base 6 shifts to the end plate 3 side by reversely rotating the ball screw 7. Accordingly, the reticle 64 roughly faces to the second microscope 33 as shown in FIGS. 2A, 9B.

In this case, the arithmetic and control circuit 62 stores the number of driving pulses from the position where the center O of the reticle 64 aligns with the optical axis O1 of the first microscope 17 to the position where the reticle 64 roughly faces to the second microscope 33*a* as shown in FIGS. 2A, 9B in the memory 62*a* as the number of alignment driving pulses.

In addition, the second microscope 33 is provided with a cross line (target line) 33 inclined at 45° as illustrated in FIG. 9B1. The center of the cross line (target, target line) 33*a* is the optical axis O2 of the second microscope 33.

Thus, after the reticle 64 has roughly faced to the second microscope 33, while observing the reticle 64 by the second microscope 33, the slide base 6 reciprocates in the X-direction by operating the switches 8*a*, 8*b*, and the optical axis O2 of the second microscope 33 substantially aligns with the Y-line 66*b* of the reticle 64 shown in FIG. 9B1 by reciprocating the slide base 20 in the optical axis O2 direction.

After this operation, the worker slightly moves the elevation base 27 upwardly and downwardly (Y-direction) by operating the micrometer 28, and slightly moves the X-table 30 in the X-direction by operating the micrometer 52. Accordingly the optical axis O2 of the second microscope 33 aligns with the optical axis O1 of the reticle 64 as illustrated in FIG. 9B1.

The alignments of the optical axes of the first and second microscopes 17, 33 with respect to the center of the reticle 64 are carried out only once, respectively.

(2) Alignment of the First Micro-Alignment Member

Figure 14:
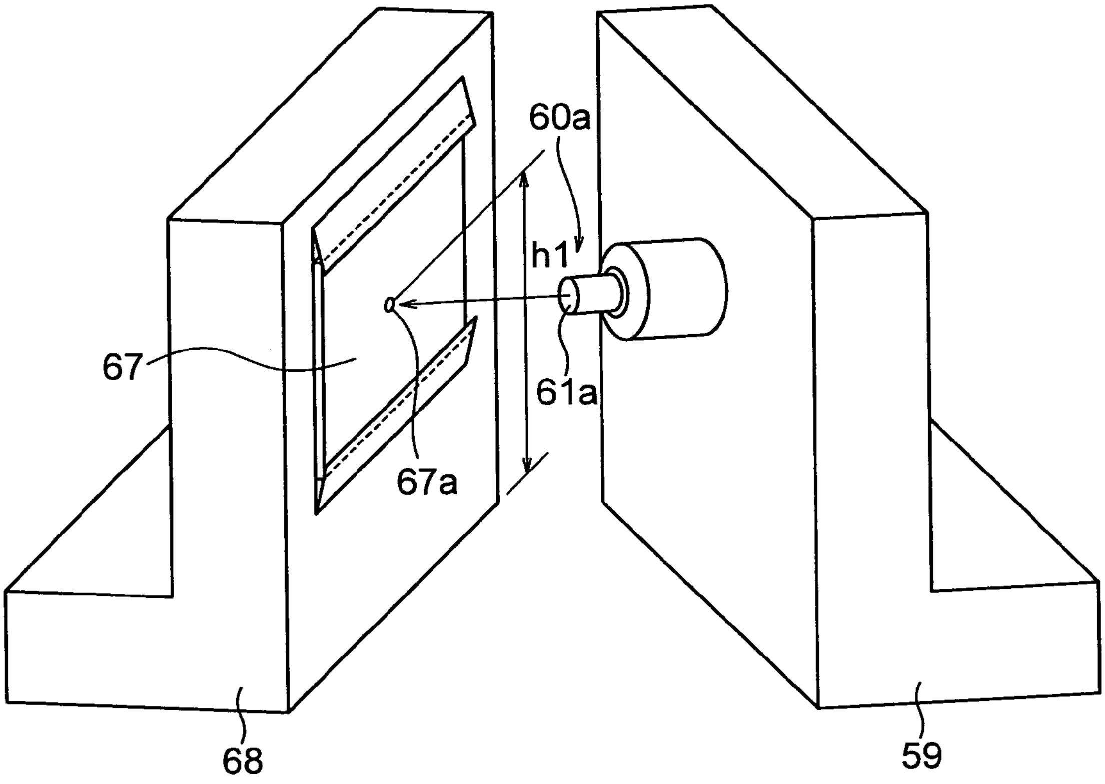
FIG. 14 is an explanation view illustrating relationship between the VCSEL and the one end portion of the optical fiber.

Next, the reticle holder 65 shown in FIG. 2A is detached from the slide base 6, and the one end portion 60*a* of the optical fiber 60 of the first micro-alignment member (micro-optical element) is held to the holder 59 as shown in FIG. 2A. In this case, in the optical fiber 60, the clad 60*c* neighboring the core 60*b* is held as shown in FIG. 14.

With this state, if the diving motor 40 normally rotates by the arithmetic and control circuit 62 by pressing the switch 40*a*, the ball screw 39 normally rotates. The slide base 38 shifts to the end plate 35 side by normally rotating the ball screw 39. Accordingly, the X-Y adjusting device 41 and tilting equipment 53 on the slide base 38 roughly shift on the ball screw 7 of the first guide frame 1 by shifting the slide base 38.

After the above operation, while observing the end plane of one end portion 60*a* of the optical fiber 60 by the second microscope 33, the worker elevates the elevation base 47 in the Y-direction by operating the micrometer 48 and reciprocates the X table 50 in the X-direction by operating the micrometer 52, and then the optical axis O2 of the second microscope 33 is moved and adjusted with respect to the optical axis O3 of the approximately center of the end face of the core 60*b* of the one end portion 60*a*. Accordingly, the center of the end face of the core 60*b* of the one end portion 60*a* aligns with the optical axis O2 of the second microscope 33 as illustrated in FIGS. 10A, 10B. With this position, the X-Y plane (vertical plane) including the axis line 7*a* of the ball screw 7 substantially aligns with the end plane of the core 60*b*.

(3) Alignment of the Second Micro-Alignment Member (Alignment with Respect to the First Microscope)

Figure 7:
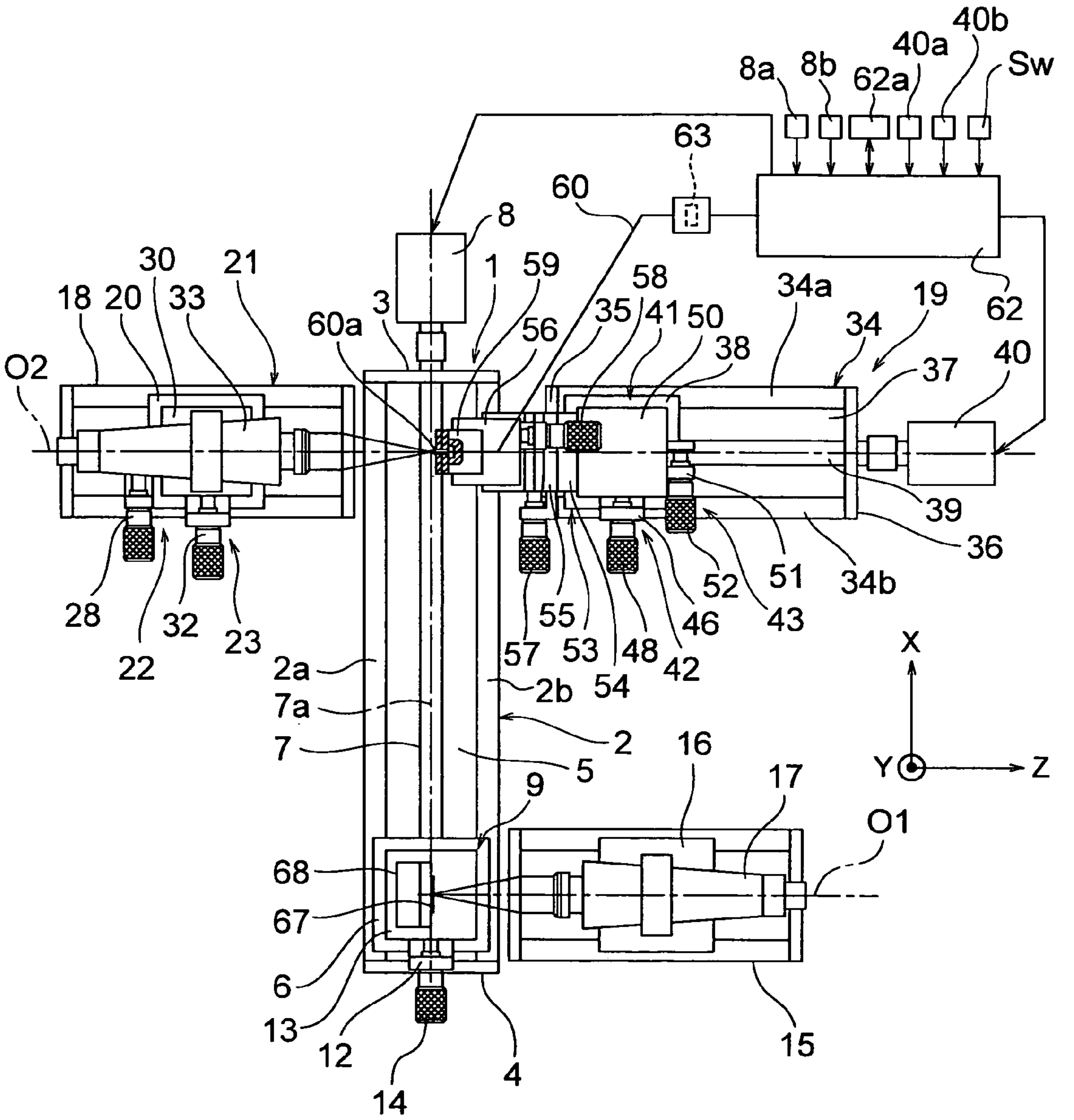
FIG. 7 is a plan view of an alignment device of micro-alignment members illustrating a state that the VCSEL is mounted on the elevation base on the first guide frame instead of the reticle.
Figure 8:
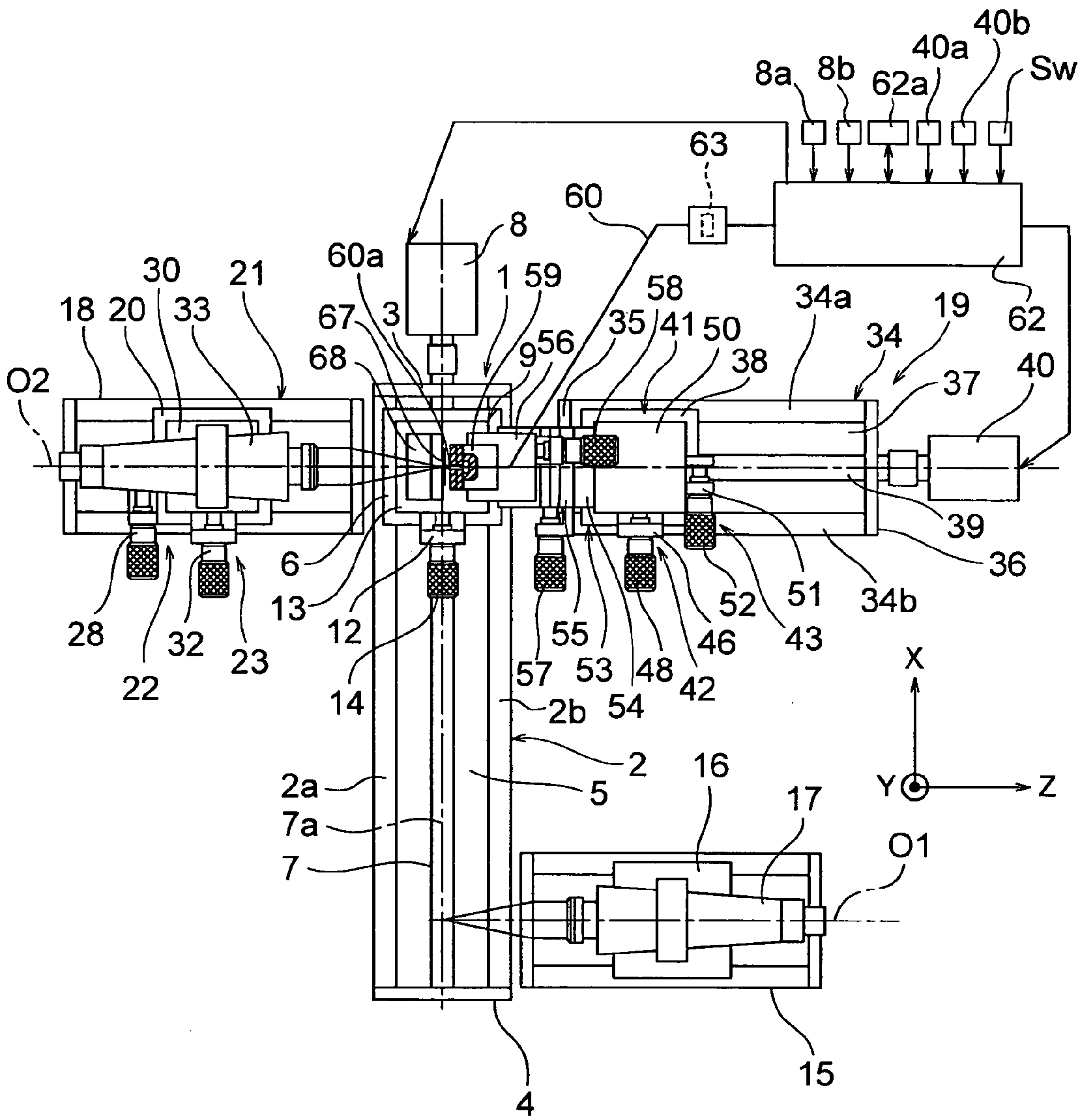
FIG. 8 is a plan view of an alignment device of micro-alignment members showing a state that the VCSEL illustrated in FIG. 7A faces to the optical fiber.
Figure 12:
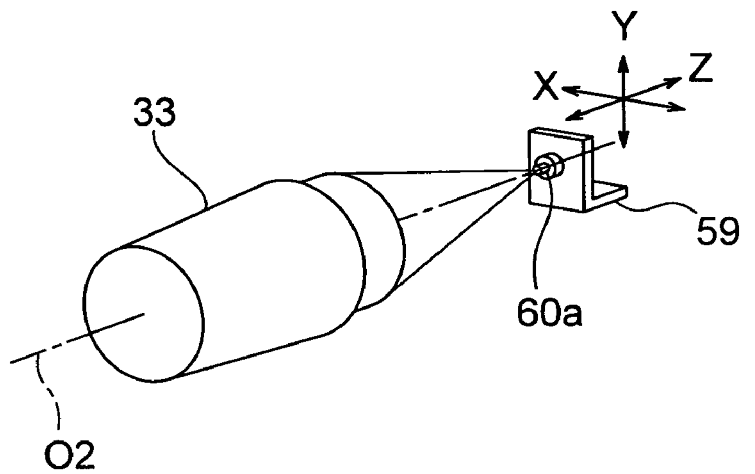
FIG. 12 is a perspective view schematically showing the relationship between the second microscope and the one end portion of the optical fiber.
Figure 13:
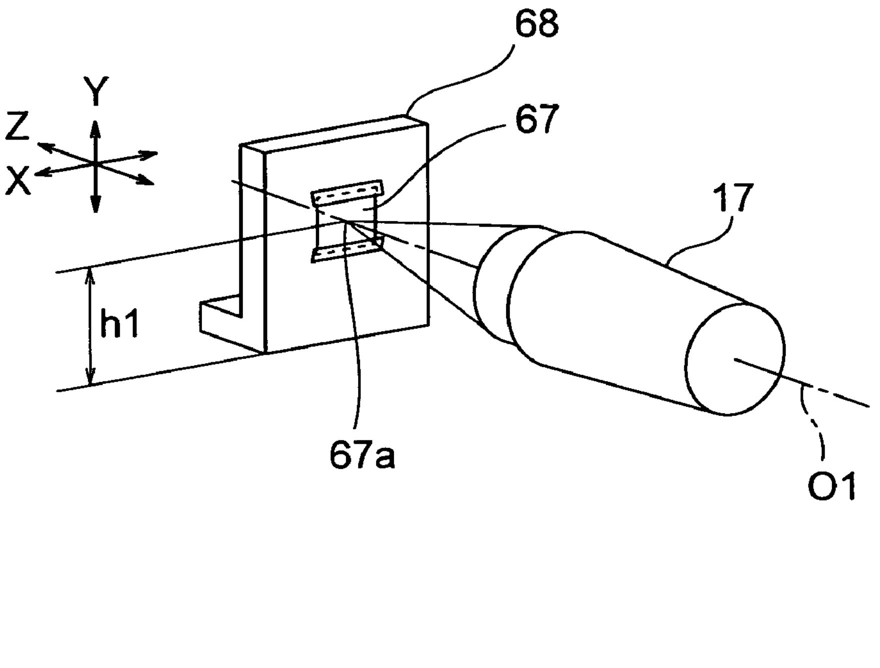
FIG. 13 is a perspective view illustrating the relationship between the first microscope and the VCSEL.

Next, as shown in FIG. 7, the slide base 6 is positioned to the first microscope 17 side, and a VCSEL holder 68 in which a VCSEL 67 of a second micro-alignment member (micro optical element) is held as shown in FIGS. 13, 14 is prepared. The height from the lower end of the VCSEL holder 68 to a luminous point 67*a* of the VCSEL 67 is previously set to substantially conform to the height from the lower end of the reticle holder 65 to the optical axis O of the reticle 64.

Particularly, even though the height from the lower end of the VCSEL holder 68 to the luminous point 67*a* of the VCSEL 67 is configured to conform to the height from the lower end of the reticle holder 65 to the optical axis O of the reticle 64, both of the heights do not conform completely because both of the heights include manufactured measurement errors.

Therefore, the VCSEL holder 68 is attached to the position to which the reticle holder 65 is attached on the slide base 6, such that the luminous point 67*a* of the VCSEL 67 held by the VCSEL holder 68 faces to the first microscope 17.

With this state, while observing the luminous point 67*a* by the first microscope 17, the worker reciprocates the slide base 6 in the X direction by operating the switches 8*a*, 8*b*, and moves and adjusts (micromotion operation) the elevation base (holder mounting member) 13 in the direction orthogonal to the optical axis O1 of the first microscope 17 and the moving direction of the slide base 6 by operating the micrometer 14. The center O of the VCSEL 67, accordingly, aligns with the optical axis O1 of the first microscope 17 as shown in FIG. 10B1.

(Alignment with Respect to the Second Microscope)

Next, the worker shifts the slide base 38 to the end plate 36 side by pressing the switch, such that the distance between the X-Y plane including the axis line 7*a* of the ball screw 7 and the end face 61*a* of the mirror surface layer 61 of the optical fiber 60 spaces at a predetermined distance α.

After this, if the start switch SW is pressed, the arithmetic and control circuit 62 supplies a driving pulse to the driving motor 8 for the number of alignment driving pulses stored in the memory 62*a*, and then reversely rotates the driving motor 8 by a predetermined rotation speed. Along the reverse rotation of the driving motor 8, the ball screw 7 reversely rotates, and then the slide base 6 shifts in the direction of the end plate 3. Accordingly, the VCSEL 67 shifts to the one end portion 60*a* side of the optical fiber 6 as shown in the allow 69 of FIG. 1.

Moreover, the VCSEL holder 68 shifts to one end portion 60*a* side of the optical fiber 6 as shown in FIG. 2A, and the luminous point 67*a* of the VCSEL 67 faces to the end face 60*d* of the optical fiber 60 through the mirror surface layer 61. With this position, the distance from the end face 61*a* of the mirror surface layer 61 to the surface of the VCSEL 67 spaces at a predetermined distance α. This predetermined distance α is set more than a distance that the light emitted from the luminous point 67*a* of the VCSEL 67 does not resonate.

In addition, the VCSEL 67 comprises a reflection mirror 69, a transparence electrode (intermediate layer) 70, an active layer 71, and an electrode 72 in which an opening portion 72 for defining the luminous point 67*a* is disposed.

If the luminous point 67*a* of the VCSEL 67 faces to the end face 60*d* of the optical fiber 60 through the mirror surface layer 61, the arithmetic and control circuit 62 applies driving voltage to the electrodes 70, 72 to radiate the light from the opening portion 72*a* toward the mirror surface layer 61. The light radiated from the opening portion 72*a* includes from long-wavelength to short-wavelength.

Figure 17:
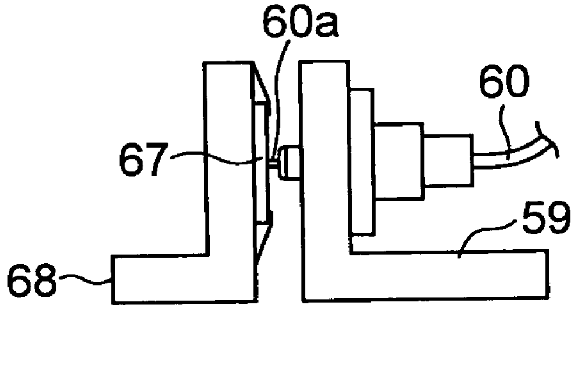
FIG. 17 is a side view showing the relationship between the VCSEL and the one end portion of the optical fiber.
Figure 18:
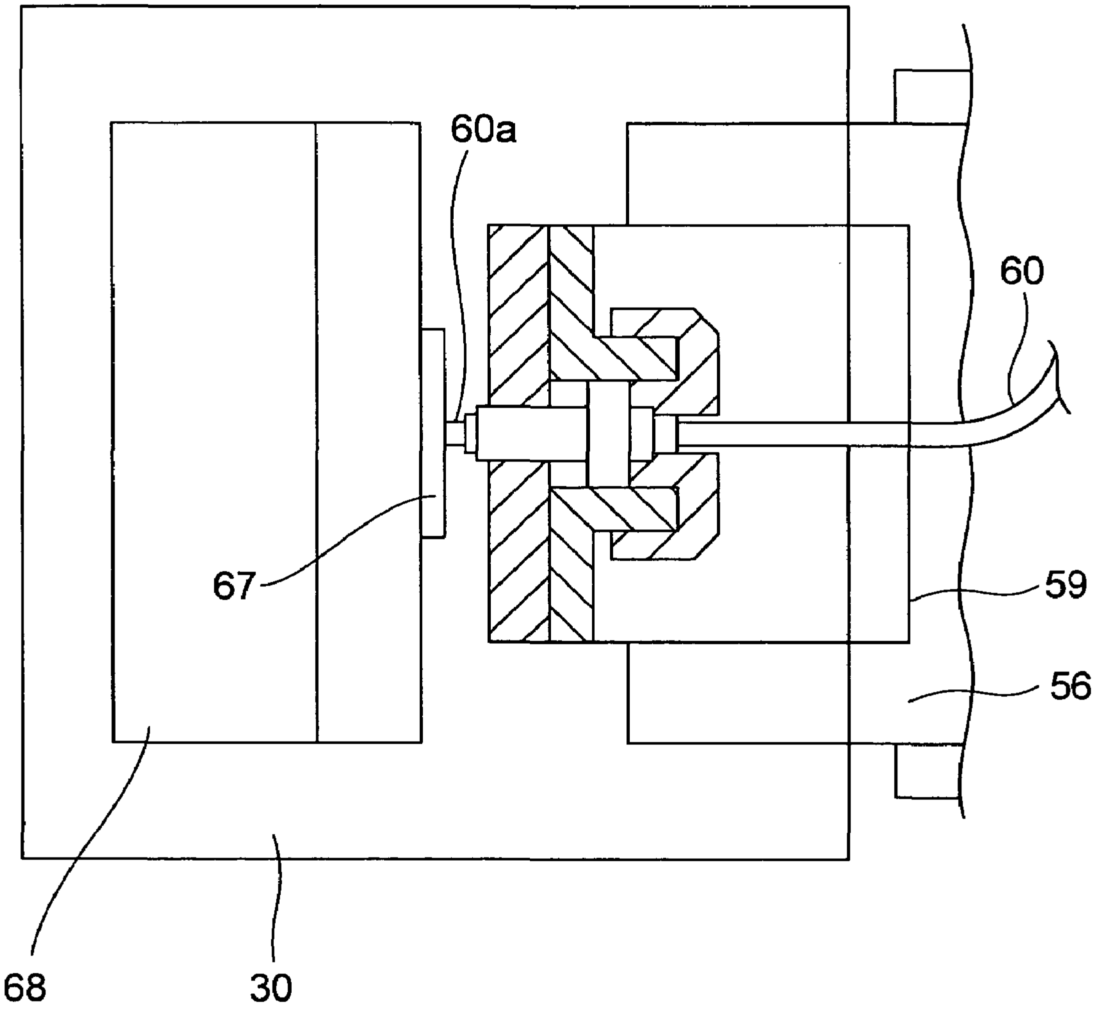
FIG. 18 is a plan view illustrating the relationship between the VCSEL and the one end portion of the optical fiber held by the partially broken holder.

Furthermore, the arithmetic and control circuit 62 shifts the slide base 38 from the position spaced at a predetermined distance α to the end plate 35 side with respect to a predetermined pitch. Along this movement, the optical fiber 60 and the VCSEL 67 come close as shown in FIGS. 17, 18. Thus, a distance Za between the end face 61*a* of the mirror surface layer 61 and the reflection mirror 69 changes. The light having the distance Za as ½ wavelength in the light radiated from the opening portion 72*a* resonates between the end face 61*a* of the mirror surface layer 61 and the reflection mirror 69.

Figure 19A:
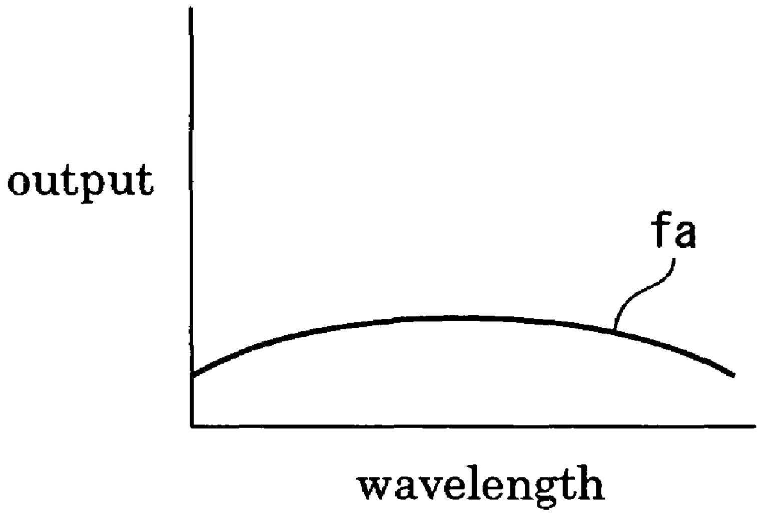
FIG. 19A is a characteristic diagram illustrating the light transmittance characteristic of the optical fiber in the state shown in FIG. 16.
Figure 19B:
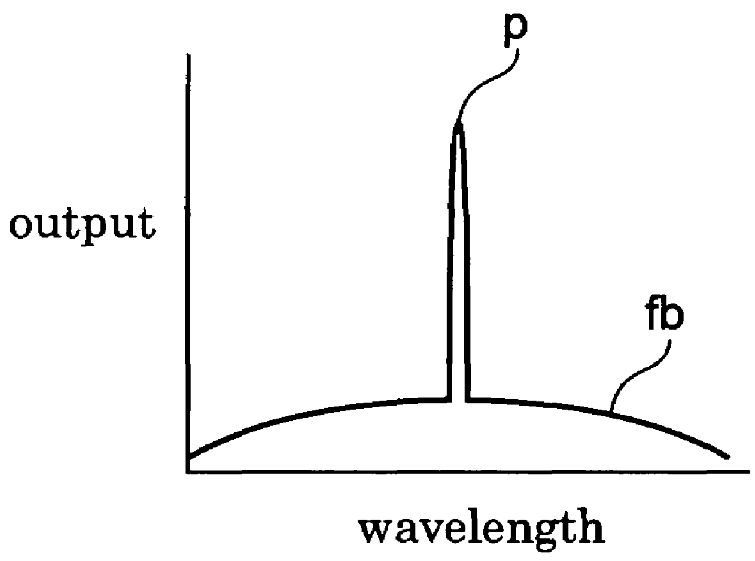
FIG. 19B is a characteristic diagram showing the light transmittance characteristic of the optical fiber in the states shown in FIGS. 15, 17, and 18.

The resonated light is output as a laser light and penetrates the mirror surface layer 61, and then is received by the light-receiving sensor 63 through the optical fiber 60. In this case, the output signal from the light-receiving sensor 63 becomes a peak wavelength P as illustrated in FIG. 19B. This peak wavelength P changes in accordance with the distance Za.

As described above, the alignment device of the micro-alignment member of the present invention comprises the slide base 6 reciprocatably held to the guide member (first guide frame 1), the holder mounting member (elevation base 13) mounted on the slide base 6, the first and second microscopes 17, 33 disposed in the sides of the guide member (first guide frame 1) with a space in the longitudinal direction of the guide member, and the first micro-alignment member (one end portion 60*a* of optical fiber 60) arranged to face the second microscope 33 across the guide member (the first guide frame 1).

The alignment method of the micro-alignment member includes a first step for mounting the reticle 64 on the holder mounting member (elevation base 13), for moving the slide base 6 along the guide member (first guide frame 1) such that the reticle 64 faces to the first microscope 17, and for moving and adjusting the holder mounting member (elevation base 13) in the direction orthogonal to the optical axis O1 of the first microscope 17 and the moving direction (X-direction) of the slide base 6 such that the center O of the reticle 64 aligns with the optical axis O1 of the first microscope 17 while observing the reticle 64 by the first microscope 17.

Moreover, the alignment method of the micro-alignment member includes a second step for moving the slide base 6 to face the second microscope 33, and for moving and adjusting the second microscope 33 in the direction orthogonal to the optical axis O2 and the moving direction (X-direction) of the slide base 6 such that the center O of the reticle 64 aligns with the optical axis O2 of the second microscope 33 while observing the reticle 64 by the second microscope 33.

Furthermore, the alignment method of the micro-alignment member includes a third step for moving and adjusting the first micro-alignment member (one end portion 60*a* of optical fiber 60) in the direction (Y-direction) orthogonal to the optical axis O2 of the second microscope 33 and the moving direction (X-direction) of the slide base 6, such that the center of the first micro-alignment member (one end portion 60*a* of optical fiber 60) aligns with the optical axis O2 of the second microscope 33.

In addition, the alignment method of the micro-alignment member comprises a fourth step for mounting the second micro-alignment member (VCSEL 67) onto the holder mounting member (elevation base 13) instead of the reticle 64, such that the second micro-alignment member (VCSEL 67) faces to the first micro-alignment member (end face of one end portion 60*a* of optical fiber 60).

According to the alignment method of the micro-alignment members, it is possible to align the micro-alignment members with high accuracy when the micro-alignment members align by facing each other.

In the alignment device of the micro-alignment members of the embodiment of the present invention, the slide base 6 is reciprocatably disposed in the guide member (first guide frame 1). The first and second microscopes 17, 33 to which the optical axes O1, O2 are directed in the direction orthogonal to the extending direction (X-direction) of the guide member (first guide frame 1) are arranged in the sides of the guide member (first guide frame 1). The first and second microscopes 17, 33 are arranged with a space in the extending direction of the guide member (first guide frame 1).

The alignment device is also provided with the first stage (X table 30) for supporting the second microscope 33, the second stage (X micromotion table 50) corresponding to the first stage (X table 30) across the guide member (first guide frame 1), and the mounting member (holder 59) of the first micro-alignment member (one end portion 60*a* of optical fiber 60) on the second stage (X micromotion table 50).

Moreover, in the alignment device, the holder mounting member (elevation base 13) is adjustably attached to the slide base 6 in the direction (Y-direction) orthogonal to the optical axes O1, O2 for selectively mounting the holder of the reticle 64 or the holder (reticle holder 65 or VCSEL holder 68) of the second micro-alignment member (VCSEL 67).

Furthermore, the first stage (X table 30) is provided with the second microscope 33 to be moveable and adjustable in the same directions of the moving direction (X-direction) of the slide base 6 and the moving direction (Y-direction) of the holder mounting member (elevation base 13). The second stage (X micromotion table 50) is provided with the mounting portion (holder 59) of the first micro-alignment member (one end portion 60*a* of the optical fiber 60) in the same directions of the moving direction (X-direction) of the slide base 6 and the moving direction (Y-direction) of the holder mounting member (elevation base 13).

According to the above structure, by including the above first to fourth steps, it is possible to align the micro-alignment members with high accuracy when the micro-alignment members align by facing each other.

In the embodiment of the present invention, the alignment is carried out while observing with the first microscope or the second microscope. However, the alignment of the present invention can be carried out by intermittently observing with the first microscope or the second microscope.

In the above embodiment, the one end portion 60*a* of the optical fiber 60 and the VCSEL 67 are illustrated as the micro-alignment members; however, the micro-alignment members are not limited to the one end portion 60*a* of the optical fiber 60 and the VCSEL 67. For example, an optical element such as a light guide is used as the micro-alignment member. In case of aligning, alignment between a light guide (optical element) and an optical fiber (optical element) and alignment between an optical fiber (optical element) and an optical fiber (optical element), etc., can be considered. Moreover, the micro-alignment member can not be limited to the optical element such as the light guide and the optical fiber.

The operation portions of the micrometers 14, 28, 32, 48, 52, 57, and 58 can be changed to driving motors such as pulse motors. In addition, the first and second microscopes 17, 33 can be changed to TV cameras. In this case, the above described positioning can be carried out by observing picture signals from the TV cameras by monitors.

(Problems of VCSEL and the Like)

(a) The surface of the VCSEL is provided with the pad for the electrode, so that the surface of the VCSEL is not plane surface. Accordingly, it is impossible to directly observe the surface of the VCSEL from the top surface and the side surfaces such as the alignment between the light guide and the optical fiber and the alignment between the optical fiber and the optical fiber.

(b) The VCSEL 67 is arranged in array on a surface of 5 mm to 10 mm chip. The alignment should be carried out by selecting the VCSEL to be used from the surface. However, with the state that the optical fiber faces to the VCSEL, the alignment can not be performed since a device for observing the surface of VCSEL is not included.

(c) The above end plane of one end portion 60*a* of the optical fiber 60 is coated with the mirror surface layer 61, and light does not penetrate 99% and over in a normal state. Therefore, an alignment using the light is impossible.

(d) The distance between the VCSEL 67 and the end face of one end portion 60*a* of the optical fiber 60 should be about 1 μm to 2 μm. In order to approximate the end face of one end portion 60*a* of the optical fiber 60 to the luminous point 67*a* of the VCSEL 67, the leading end portion of the optical fiber 60 should be only a core wire (core 60*b*). Accordingly, one end portion 60*a* of the optical fiber 60 and the end face of ferule can not be bonded. Since the leading end of the optical fiber is free, the end face may title. Therefore, there may be a case requiring a mechanism for correcting title.

(e) There is no surface and edge to be used for the parallelism of the VCSEL 67 and the end face of the optical fiber 60.

(Solutions)

(i) The two microscopes (first and second microscopes 17, 33) which are relatively positioned in advance are used.

(ii) The positioning of the VCSEL 67 and the end face of the optical fiber 60 are independently performed through direct observing by the respective microscopes (first and second microscopes 17, 33).

(iii) The alignment of the coordinates of the VCSEL 67 and the end face of the optical fiber 60 stops at this step.

(iv) The relative positioning is carried out by shifting the VCSEL 67 or the end face of the optical fiber 60 with the high-performance stage.

(v) The rotation table can be mounted on the X micromotion table (stage) 30 to rotate horizontally, the holder mounting member is mounted on the rotation table to rotate upwardly and downwardly, the rotation table can be disposed to be horizontally rotatable by the driving device such as a micro meter or a pulse motor, the holder mounting member can be disposed to be rotatable upwardly and downwardly by the driving device such as a micrometer or a pulse motor, and the holder 59 can be mounted on the holder mounting member to held the one end portion 60*a* of the optical fiber 60.

The inclinations of the end face of the luminous point 67*a* of the VCSEL 67 and the end face of the optical fiber 60 (end face 61*a* of the mirror surface layer 61) are observed and measured by the first and second microscopes 17, 33, respectively, such that the luminous point 67*a* of the VCSEL 67 and the end face of the optical fiber 60 can be parallel by the operation of the driving device. In addition, when the inclinations of the end face of the luminous point 67*a* of the VCSEL 67 and the end face of the optical fiber 60 are detected by a TV camera, etc., the end face of the luminous point 67*a* of the VCSEL 67 can faces to the end face of the optical fiber 60 in parallel by driving and controlling the pulse motor, etc., based on the detected results.

(Effects)

(A) Alignment and surface matching can be easily carried out between micro-elements (micro-alignment members) having uneven shapes.

(B) Coupling can be easily performed between micro-elements (micro-alignment members) that the matching surfaces can not be directly observed.

(C) When the matching surfaces are arranged in array such as the VCSEL and light guide, alignment can be conducted by selecting a free point.

(D) More than two surfaces can be aligned by changing the stage structure or adding the microscope.

(E) The preset invention can be applied to various micro-elements (micro-alignment member) because the change in light intensity is not roughly used.

(F) Since the matching surfaces are observed by using an observation microscope of about 100× to 400×, it is possible to reduce the cost.

According to the above structure, it is possible to align the micro-alignment members with high accuracy when the micro-alignment members align by facing each other.

What is claimed is:

1. An alignment method of micro-alignment members, comprising:

a step for preparing a slide base reciprocatably held to a guide member, a holder mounting member mounted on the slide base, a first microscope disposed on one side of the guide member, the first microscope having an optical axis orthogonal to a longitudinal direction of the guide member, a first micro-alignment member disposed on the one side of the guide member spaced from the first microscope in the longitudinal direction of the guide member, and a second microscope disposed on the other side of the guide member to face to the first micro-alignment member across the guide member, the second microscope having an optical axis orthogonal to the longitudinal direction of the guide member;

a first step for mounting a reticle on the holder mounting member, for moving the slide base along the guide member such that the reticle faces to the first microscope, and for moving and adjusting the holder mounting member in a direction orthogonal to each of the optical axis of the first microscope and a moving direction of the slide base and in the moving direction of the slide base, such that a center of the reticle aligns with the optical axis of the first microscope;

a second step for moving the slide base along the guide member such that the reticle faces to the second microscope, and for moving and adjusting the second microscope in a direction orthogonal to each of the optical axis of the second microscope and the moving direction of the slide base and in the moving direction of the slide base, such that the center of the reticle aligns with the optical axis of the second microscope;

a third step for moving and adjusting the first micro-alignment member in a direction orthogonal to each of the optical axis of the second microscope and the moving direction of the slide base and in the moving direction of the slide base, such that a center of the first micro-alignment member aligns with the optical axis of the second microscope; and a fourth step for mounting a second micro-alignment member on the holder mounting member instead of the reticle, for moving the slide base along the guide member such that the second micro-alignment member faces to the first microscope, and for moving and adjusting the holder mounting member in the direction orthogonal to each of the optical axis direction of the first microscope and the moving direction of the slide base and in the moving direction of the slide base, such that the center of the second micro-alignment member aligns with the optical axis of the first microscope, and a fifth step for moving the slide base along the guide member from a position that the center of the second micro-alignment member aligns with the optical axis of the first microscope to a position that the center of the second micro-alignment member aligns with the optical axis of the second microscope, such that the second micro-alignment member faces to the second microscope.

2. An alignment device of alignment members, comprising:

a slide base reciprocatably disposed in a guide member;

a first microscope disposed on one side of the guide member, the first microscope having an optical axis orthogonal to a longitudinal direction of the guide member;

a second microscope disposed on the other side of the guide member spaced from the first microscope in the longitudinal direction of the guide member, the second microscope having an optical axis orthogonal to the longitudinal direction of the guide member;

a first stage for supporting the second microscope;

a second stage corresponding to the first stage across the guide member;

a mounting portion of a first micro-alignment member provided in the second stage; and a holder mounting member for selectively mounting a holder of a reticle or a holder of a second micro-alignment member, wherein, the holder mounting member is movably and adjustably mounted on the slide base in a direction orthogonal to the optical axis of the first and second microscopes and a moving direction of the slide base, the first stage is provided with the second microscope to be movable and adjustable in the same directions of the moving direction of the slide base and the moving direction of the holder mounting member, and the second stage is provided with the mounting portion of the first micro-alignment member to be movable and adjustable in the same directions of the moving direction of the slide base and the moving direction of the holder mounting member.

3. The alignment method of micro-alignment members according to claim 1, wherein when moving the slide base from the position that the center of the reticle aligns with the optical axis of the first microscope to the position that the reticle faces to the second microscope, driving pulses are supplied to a driving motor, which drives for moving the slide base, from an arithmetic and control device for controlling an operation of the driving motor, so as to operate the driving motor, and the slide base is moved along the guide member, when moving the slide base from the position that the center of the reticle aligns with the optical axis of the first microscope to the position that the reticle faces to the second microscope, the number of the driving pulses supplied from the arithmetic and control device to the driving motor is stored in a memory connected with the arithmetic and control device, and in a state that the slide base is located in a position that the center of the second micro-alignment member aligns with the optical axis of the first microscope, the number of the driving pulses, stored in the memory is supplied to the driving motor to drive the driving motor, and the slide base is moved along the guide member toward the second microscope and the first micro-alignment member.

4. The alignment device according to claim 2, further comprising a driving motor, which drives for moving the slide base along the guide member, an arithmetic and control device for controlling an operation of the driving motor by supplying driving pulses to the driving motor, and a memory connected with the arithmetic and control device, wherein the memory stores the number of the driving pulses supplied from the arithmetic and control device to the driving motor when moving the side base from a position that the center of the reticle aligns with the optical axis of the first microscope to a position that the reticle faces to the second microscope, and in a state that the slide base is located in a position that the center of the second micro-alignment member aligns with the optical axis of the first microscope, the arithmetic and control device supplies the number of the driving pulses stored in the memory to the driving motor to drive the driving motor, and moves guide member toward the second microscope toward between the second microscope and the first micro-alignment member.

* * * * *